UNITED STATES PATENT OFFICE.

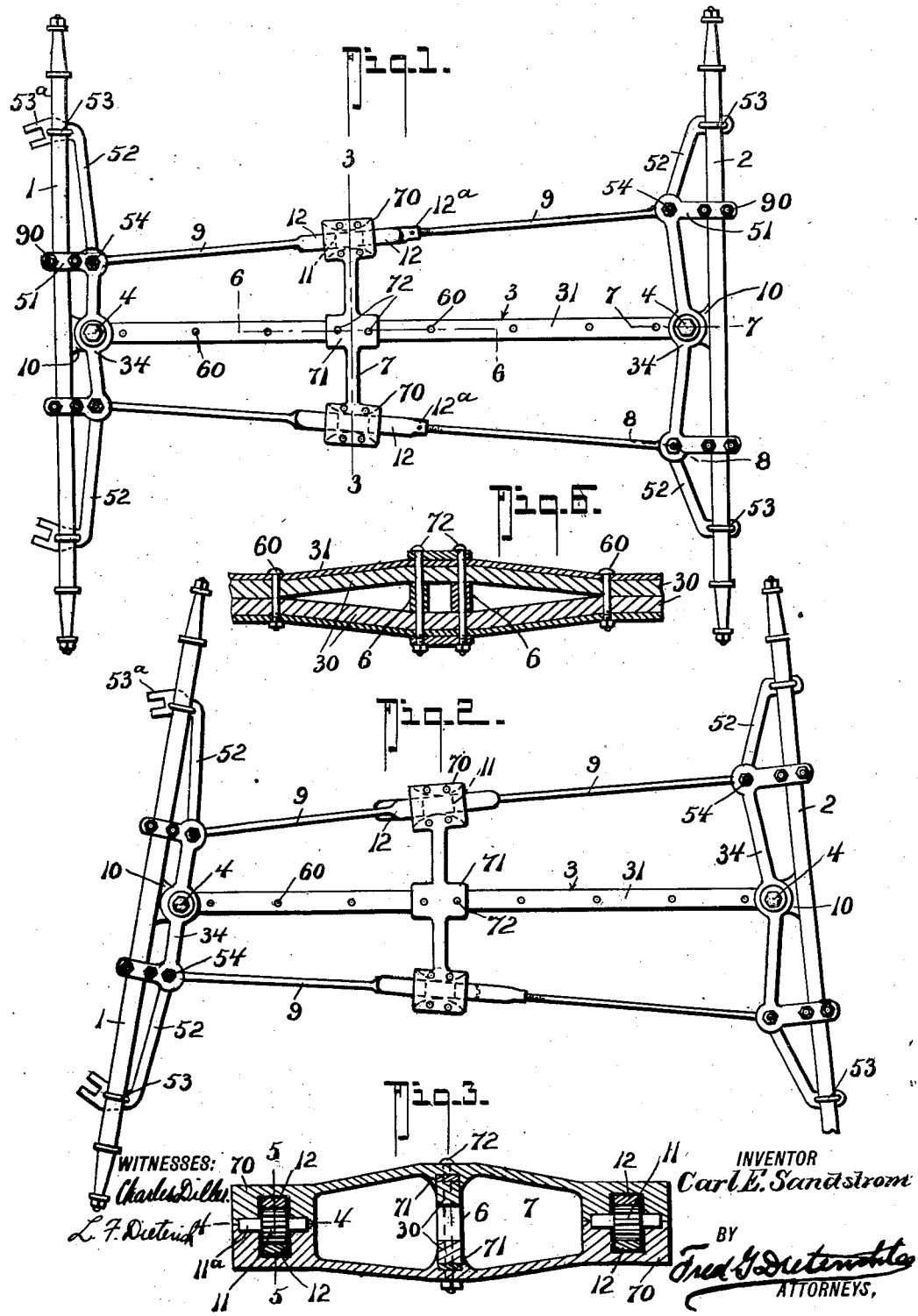

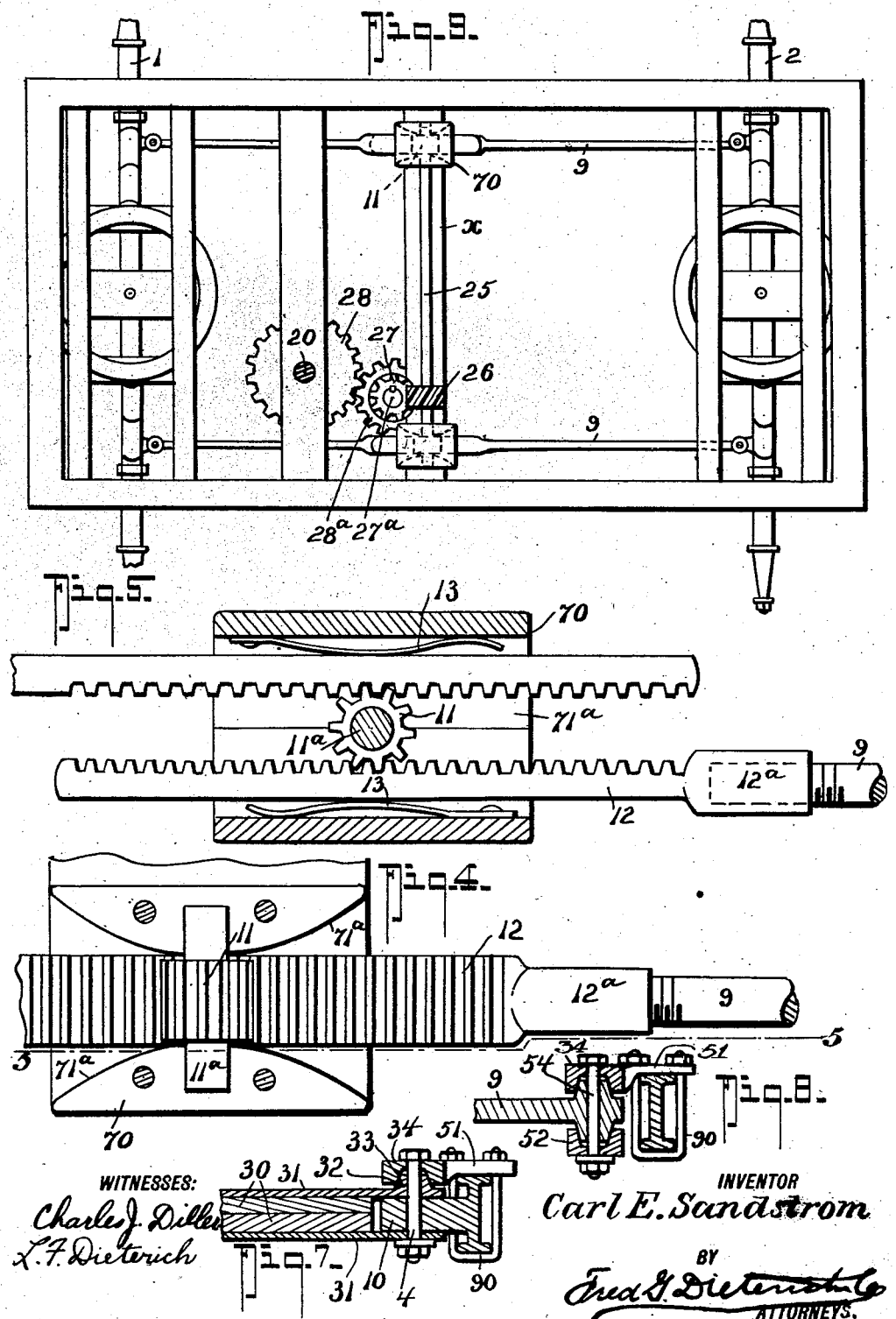

CARL E. SANDSTROM, OF INDIANAPOLIS, INDIANA, ASSIGNOR OF ONE-HALF TO THEODORE SANDSTROM, OF INDIANAPOLIS, INDIANA.

SHORT-TURNING GEAR.

1,186,338. Specification of Letters Patent. Patented June 6, 1916.

Application filed September 21, 1915. Serial No. 51,799.

*To all whom it may concern:*

Be it known that I, CARL E. SANDSTROM, residing at Indianapolis, in the county of Marion and State of Indiana, have invented a new and Improved Short-Turning Gear, of which the following is a specification.

My invention is in the nature of an improved short turning gear for horse drawn and motor vehicles and trailers for automobiles and it primarily has for its object to provide a vehicle gear mechanism of the character stated of a simple and economical construction, in which the parts are compactly arranged and adapted for effectively serving their intended purposes.

With other objects in view, that will hereinafter appear, my invention embodies the peculiar features of construction and arrangement of the parts hereinafter fully explained, specifically pointed out in the appended claims and illustrated in the accompanying drawings, in which—

Figure 1 is a plan view of my short turning gear, the front and rear axles being shown in parallel position. Fig. 2 is a similar view that illustrates the gear in a turning position. Fig. 3 is a transverse section of parts of the gear taken on the line 3—3 on Fig. 1. Fig. 4 is a horizontal section thereon on the line 4—4 of Fig. 3. Fig. 5 is a longitudinal section taken on the line 5—5 of Fig. 4. Fig. 6 is a longitudinal section of a portion of the reach bar taken on the line 6—6 on Fig. 1. Fig. 7 is a transverse section on the line 7—7 of Fig. 1, of the rear end of the reach bar and the cone joint connections that join it with the rear axle. Fig. 8 is a section on the line 8—8 of Fig. 1 of the rear end of one of the rack rods, the rear axle and the cone shaped joint, that connects the rod and the axle. Fig. 9 is a diagrammatic plan view of a modified arrangement of my short turning gear, the same being adapted for use on motor vehicles.

In the practical arrangement of my improved short turning gear, the front and rear axles 1—2, each have a centrally disposed pivot lug 10 to which the opposite ends of the reach bar 3 are connected, in the manner shown in detail on Fig. 7, by reference to which it will be seen the reach bar consists of two members 30—30, faced with strap irons 31—31, the ends of the outer ones of which are separated to straddle the pivot lugs 10, and to provide for taking up rattling, the iron ends have cone shaped bearing lugs 32, for engaging the cone bearings 33 in the arms 34, the several parts mentioned being held to their connected condition by a king bolt 4, it being understood that the connections so far described are alike for the front and the rear axles.

The two members that form the body of the reach bar are separated at the center, see Fig. 6, to form a truss or bridge portion, the said two members being held apart by the spacer blocks 6 and secured by the clamp bolts 60—72, as shown in Fig. 6. By making the reach bar in the manner stated and shown, it forms a brace for holding up weight in the center.

7 designates a cross arm or bracket member composed of two half sections, the outer ends of which terminate in half housings 70—70, the purpose of which will presently appear. Midway their length, each of the cross arm members has a socket 71—71 for receiving the upper and lower reach members 30, and the said sockets 71 are fixedly held on the reach members 30, by the bolts 72 that pass down through the reach members 30 and the spacing blocks 6, as shown.

My improved short turning gear mechanism includes shiftable connections, one at each side of the reach bar, whose outer ends pivotally join with the front and rear axles in the manner presently explained and whose inner ends have a substantial telescopic relation, of such character that as the shiftable connection at one side extends, in making the turn, the other shiftable connection correspondingly shortens.

Each of the said shiftable side connections consists of two rods 9, the outer ends of which pivotally join with the arms 34 which are connected respectively to the front and rear axles, and which include angled clamps 51—51 in line with the pivots for the rods 9. The clamps 51 are attached to their respective axles by clips 90—90. Angle braces 52 are clipped at 53 to the axles and extend to the pivot bolts 54 for the rods 9. The braces 52 for the front axle have shackle portions 53ᵃ to receive the shaft couplings (not shown). It should be here stated that the pivotal connections that join the rods 9—9 to the front and rear axles are preferably cone joint connections, like the reach bar joint before referred to, and as shown in detail on Fig. 8.

Certain of the rods 9 have their inner ends threaded to adjustably engage the threaded socket 12ª of a rack bar 12—12, and the said rack bars of each pair of coöperating rods 9—9, are disposed in vertical alinement and are held in mesh with a pinion 11 on a cross stud 11ª in each of the housing ends 70 of the cross brackets 7, as is best shown in Fig. 5, from which it will be noticed the rack members, which have a free engagement with the pinion 11, to prevent binding are held to the pinion by the leaf springs 13—13, which also prevents rattling of the said parts.

To allow for a limited flexure of the side connections, the vertical walls 71ª of the housings 70 are convexed as is shown in Fig. 4.

In Fig. 9, I have shown a slightly modified arrangement of my improved short turning gear, the parts being designed for use on motor vehicles and in the said modified form, the pinions in the housings 70—70 (which in the said modified form are suitably secured to a cross member $x$ of the motor vehicle framing) are mounted on a single shaft 25 that extends transversely of the said framing and which carries a worm pinion 26 for meshing with a worm gear 27 on a shaft 27ª that has a gear 28ª to mesh with and be actuated by a gear 28 on the steering post 20, it being understood that in this latter construction as the steering post 20 is manipulated, motion is transmitted to the shaft 25 and through the pinions thereon, located within the housings 70—70 movement is imparted to the side rods 9—9, it being understood that the rack and pinion connections between the two oppositely disposed sets of rods 9—9 are coöperatively so connected that as the shaft 25 is turned, the rods 9—9 at one side will extend as the rods 9—9 on the other side correspondingly shorten, in making the turn.

From the foregoing description taken in connection with the drawings, the complete construction, the manner of operation and the advantages of my invention will readily appear.

By reason of the arrangement and coöperative connections of the parts as stated, a comparatively inexpensive construction of short turning gear is provided capable of being readily adapted for use for all forms of running gear.

While I have shown and described a preferred and practical arrangement of my invention, I desire it understood that changes in detail and in the manner of joining the several parts may be readily varied or modified to suit the particular kind of vehicle in which it is desired to use my short turning gear, without departing from my invention or the scope of the appended claims.

What I claim is:

1. In a vehicle gear, front and rear axle structures, a connection between said axles to which they are pivoted, a pair of connecting rods joined to each axle and extending toward the opposite axles, racks on the said rods, guides in which said racks move and pinions connecting adjacent racks.

2. In a short turning vehicle gear, front and rear axle structures, a reach bar to which said axles are pivotally connected, a centrally disposed cross member having an open ended housing at each end, a shiftable connection one at each side of the reach bar, the opposite ends of each of which are pivoted to the front and rear axles respectively, said shiftable connections each including two rods with rack portions movable through the open ended housings and a pinion located within each of the said housings with which the adjacent rack ends of the rods engage.

3. In a short turning vehicle gear, front and rear axle structures, a reach bar to which said axles are pivotally connected, a centrally disposed cross member having an open ended housing at each end, shiftable connections one at each side of the reach bar, the opposite ends of each of which are pivoted to the front and rear axles respectively, said shiftable connections each including two rods with rack portions movable through the open ended housings and a pinion located within each of the said housings with which the adjacent rack ends of the rods engage, the said rack ends having a loose connection with the said pinion and springs within the housings to hold the racks to the pinions to avoid rattling.

4. In a short turning vehicle gear, front and rear axle structures, a reach bar to which said axles are pivotally connected, a centrally disposed cross member having an open ended housing at each end, shiftable connections one at each side of the reach bar, the opposite ends of each of which are pivoted to the front and rear axles respectively, said shiftable connections each including two rods with rack portions movable through the open ended housings and a pinion located within each of the said housings with which the adjacent rack ends of the rods engage, said housings having convexed side walls to thereby allow a limited flexure of the rack ends within the housing when making a turn.

CARL E. SANDSTROM.